United States Patent [19]

Caussé

[11] 4,146,755
[45] Mar. 27, 1979

[54] PROTECTING FOR LOW VOLTAGE LINES, IN PARTICULAR FOR TELEPHONE NETWORKS

[76] Inventor: Raoul Caussé, 5, Villa des Orties, Bois Colombes, Hauts de Seine, France

[21] Appl. No.: 769,454

[22] Filed: Feb. 17, 1977

[30] Foreign Application Priority Data

Feb. 18, 1976 [FR] France ................ 76 04482

[51] Int. Cl.² ............................. H04Q 1/02
[52] U.S. Cl. ..................... 179/98; 179/1PC; 337/34; 361/119
[58] Field of Search .......... 179/1 PC, 1 C, 98, 184, 179/91 R, 91 A; 361/119, 124, 352; 339/18 P, 18 C, 198 R, 217 PS; 337/32, 34

[56] References Cited

U.S. PATENT DOCUMENTS

| | | | |
|---|---|---|---|
| 3,226,669 | 12/1965 | Lutz | 179/98 |
| 3,278,714 | 10/1966 | Bernutz | 339/17 L |
| 3,462,558 | 8/1969 | Selz | 179/98 |
| 3,518,611 | 6/1970 | Shores, Jr. | 179/98 |
| 3,610,836 | 10/1971 | Kimura et al. | 179/98 |
| 3,871,728 | 3/1975 | Goodman | 339/176 MP |
| 4,017,696 | 4/1977 | Falk | 179/1 PC |
| 4,017,768 | 4/1977 | Valfre | 179/98 |
| 4,053,719 | 10/1977 | Debortoli et al. | 179/98 |

FOREIGN PATENT DOCUMENTS

715685  9/1954  United Kingdom ............ 361/119

*Primary Examiner*—Kathleen H. Claffy
*Assistant Examiner*—Randall P. Myers
*Attorney, Agent, or Firm*—Sherman Levy

[57] ABSTRACT

Apparatus for protecting low voltage lines of a telephone system and including a jack block which may be mounted on a circuit breaker means having separable contact blades and such jack block has protecting elements including a plug with a plurality of contact studs that may be selectively inserted between the contact blades of the circuit breaker means.

6 Claims, 9 Drawing Figures

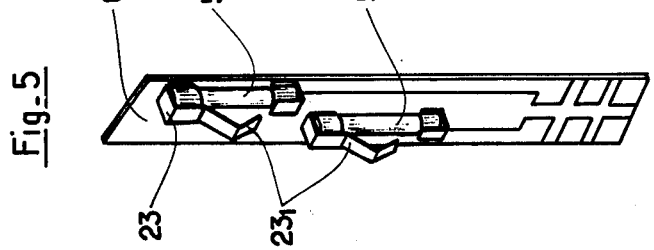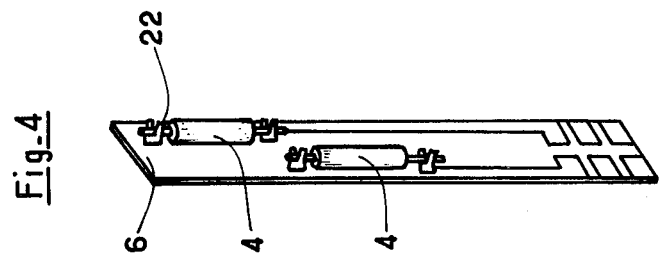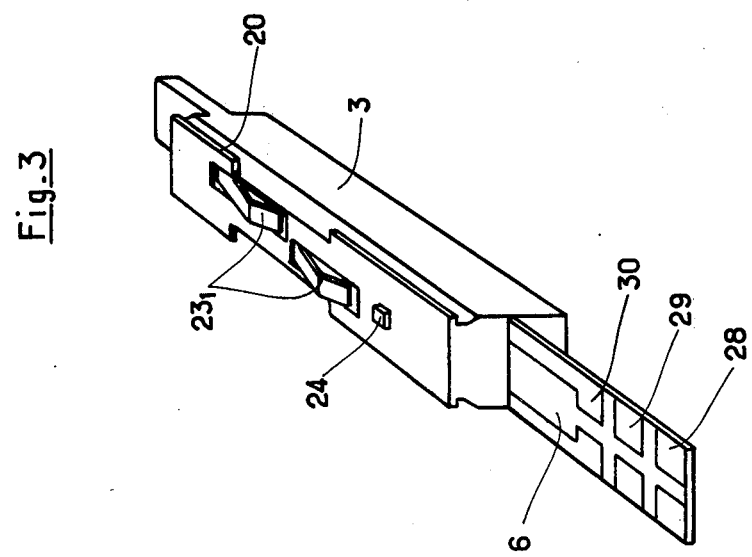

Fig_6
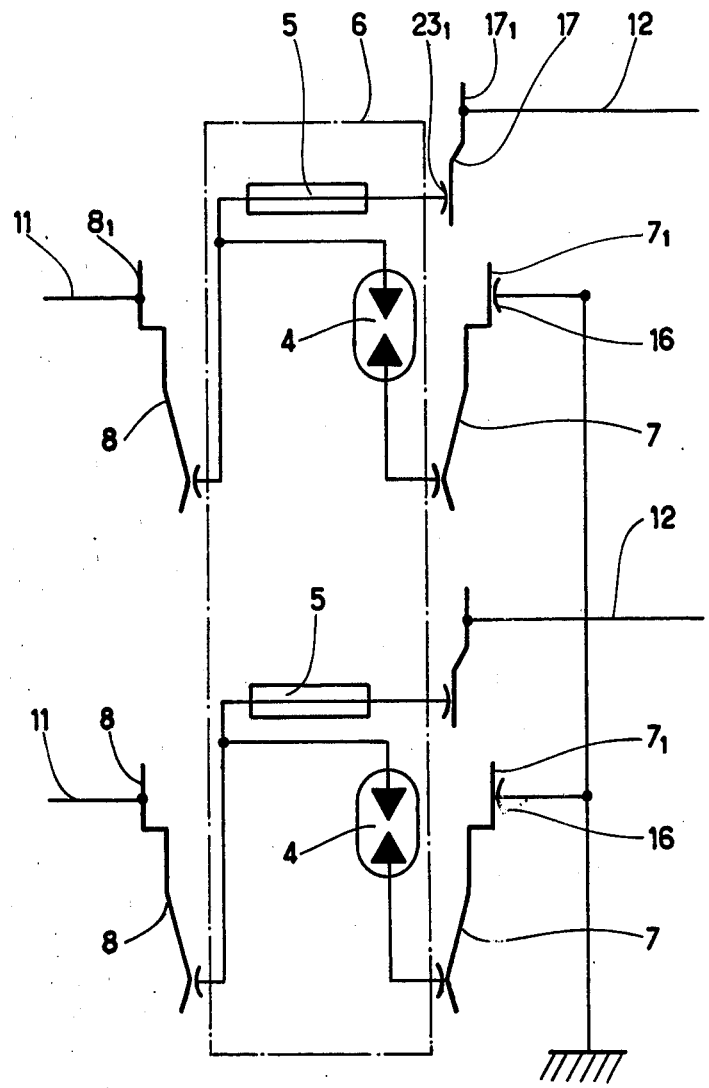

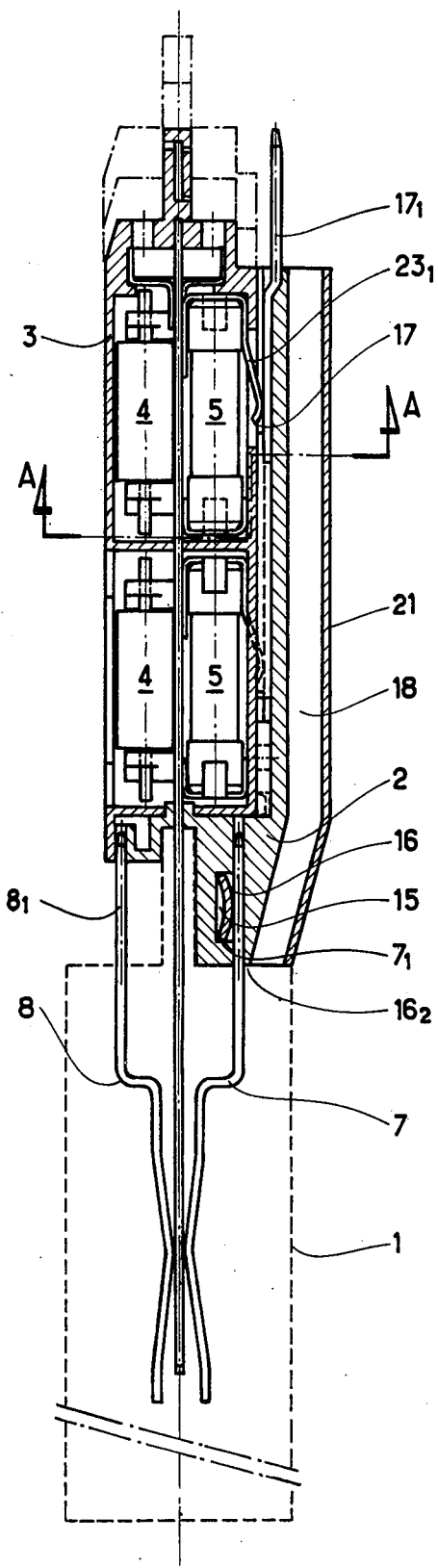

PROTECTING FOR LOW VOLTAGE LINES, IN PARTICULAR FOR TELEPHONE NETWORKS

The invention provides a protecting device for low voltage lines, in particular for telephone systems.

The device, which can be mounted on a circuit breaker having contact blades which can be separated from each other is characterized in that it consists of a jack block which may be mounted on the circuit breaker and includes a plurality of protecting elements having plugs capable of separating the contact blades of the circuit breaker and sets of protecting elements electrically connected to conducting surfaces provided on the plug so as to connect the blades of the circuit breaker and to resilient contact means to connect said protecting elements to the blades of the jack block.

According to a further characteristic feature of the invention, the jack block carries a recess which receives a contact blade, said recess communicating with passages provided for the pins of the circuit breaker.

According to another feature of the invention, the jack block includes a slot which receives a shoulder of the circuit breaker as well as passages for guiding plugs of the elements.

According to another characteristic feature of the invention, the jack block constitutes a panel receiving the elements on one side thereof, said panel having conducting surfaces engageable by the pins of the circuit breaker and defining inside channels for the passage of the conductors arranged parallel to the pins.

The invention is presented by way of non-limitative example the attached drawings, wherein:

FIG. 3 is a perspective view of the element carrying protecting elements.

FIGS. 4 and 5 are perspective views of the printed circuit of the protective element.

FIG. 6 shows the electric diagram of the jack block of the invention connected to a circuit breaker.

FIG. 7 is a vertical cross-section view of the device of the invention.

The present invention provides a device capable to be mounted on a circuit breaker in order to incorporate protecting devices into the lines of the telephone circuit. Furthermore, among all the lines ending at a circuit breaker, the device of the invention makes it possible to add a protecting device to the lines which seems to need it, while the other lines which end to the circuit breaker can be used as they were before without any protecting device.

The device provided by the invention, which has a small volume, may be mounted on a circuit breaker without increasing cumbersomeness thereof and without it being necessary to reduce the number of the interrupting pins of the installation. The device may be mounted on a circuit breaker already in service by removing the cable from one of the series of pins on the circuit breaker and connecting such cable to the series of pins provided on the jack block of the device.

Also, as it will be seen hereafter, the device of the invention includes a jack block having a plurality of protecting elements, with means for adjusting the position the elements relative to the jack block so as to insulate or ground the conductors connected to the circuit breaker or position the element so that the conductors leading to the circuit breaker can be tested.

Figure 1:
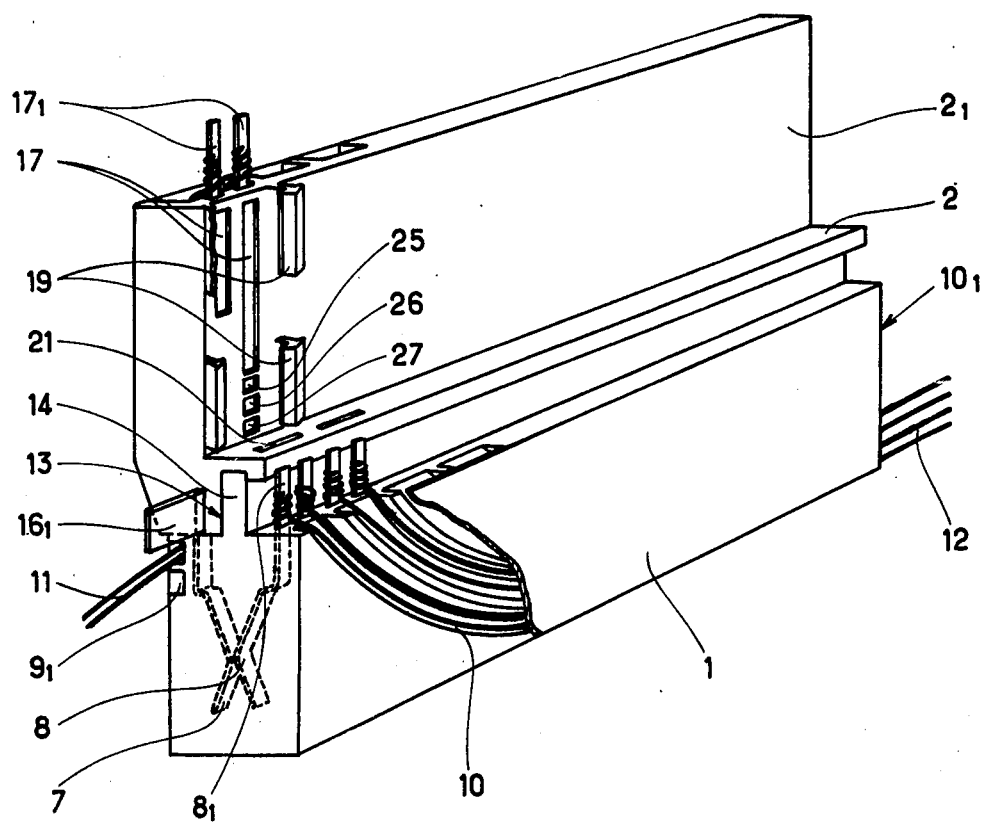
FIGS. 1 and 2 are in perspective views of the jack block of the invention attached to a circuit breaker.
Figure 2:
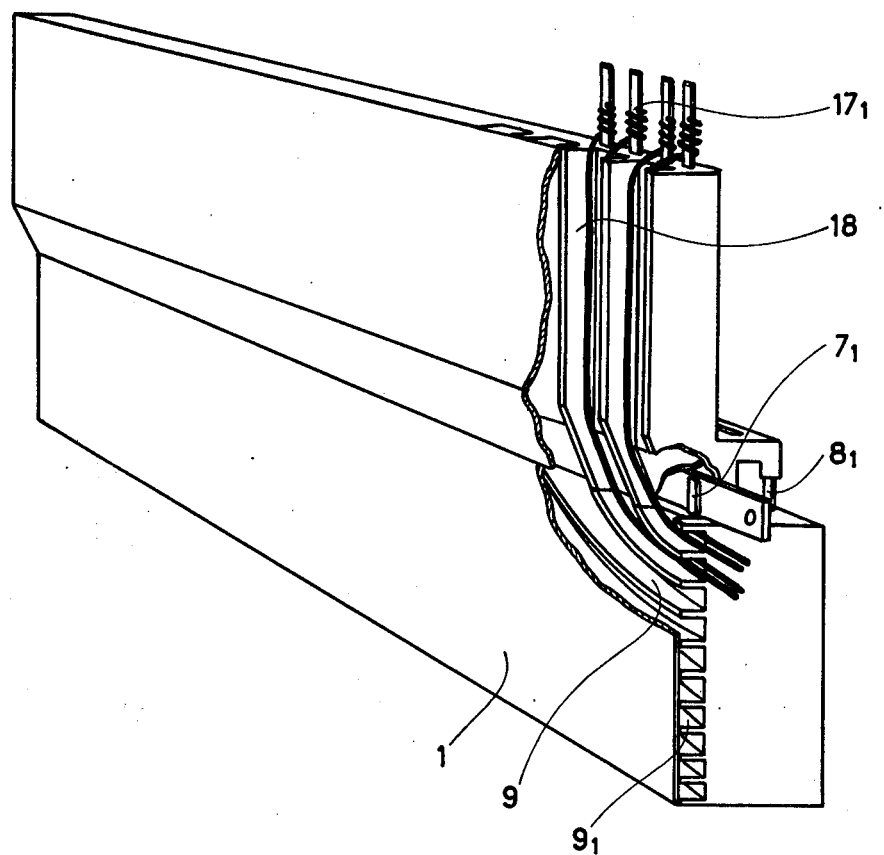
Figure 8:
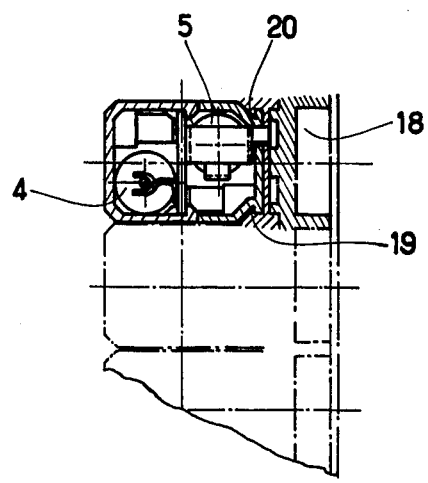
FIG. 8 is a fragmentary cross-section view along A—A of FIG. 7.

Thus, FIGS. 1 and 2 show a conventional circuit breaker for telephone systems on which the device according to the invention is mounted. The device includes a jack block 2 on which several elements 3 (see FIG. 3) are located and inside which protecting elements are arranged with ensure the protection of the circuits against over-voltages and short-circuits.

Each set of protecting elements consists of an over-voltage protecting member 4 (see FIG. 4) and a fuse 5 (see FIG. 5) arranged at each side of a small plate of a printed circuit 6 constituting the framework of the element 3.

The circuit breaker 1 includes a plurality of pairs of contacting flexible blades 7 and 8 having pins $7_1$ and $8_1$ which extend into the jack block 2. At each side of the circuit breaker 1, channels 9 and 10 are provided which are arc-shaped and terminate at one end, in the vicinity of the pins $7_1$, $8_1$, respectively, and at the other end, between $9_1$ and $10_1$ at the ends of the breaker. Said channels are designed to receive the conductors of the lines connected to the pins $7_1$, $8_1$ and, thus, for a circuit breaker of a telephone network, the conductors 11 are connected to the lines from the central office or to the autocommutation lines of the installation, while the conductors 12 are connected to the suscriber lines.

The jack block of the invention includes slot 13 at the lower edge which receives the shoulder 14 of the circuit breaker 1, which makes it possible to rapidly and securely position the jack block.

Figure 9:
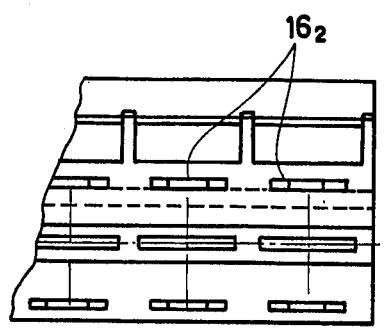
FIG. 9 is a fragmentary bottom view of the device of FIG. 7.

Furthermore, as it can be seen in FIGS. 1, 2, and 7, the jack block 2 has a cavity 15 extending the full length and which receives a metallic blade 16, preferably bent, whose end $16_1$ extends outwardly of the end of the block 2. The longitudinal cavity communicates with passages $16_2$ (see FIGS. 7 and 9) in such a way that they receive the pins $7_1$ of the circuit breaker. Such an arrangement strengthens the mechanical connection between the jack block 2 and the circuit breaker 1 and ensures the simultaneous electric connection of all the flexible contacting blades $7_1$ of the breaker to said blade 16 which is designed to be grounded.

Additionally, the jack block 2 includes a panel $2_1$ which carries, on its surface adjacent to the elements 3, conducting blades 17 having outwardly extending pins $17_1$. The portion of the panel $2_1$, which is remote from the elements 3, is hollow and carries vertical channels 18 which constitute, when the jack block 2 is nested on the circuit breaker 1, an extension of the channels 9 of the circuit breaker.

The channels 18 receive the conductors 11 which were formerly connected to the pins $7_1$ and which must now, when the protecting device is set in position, be connected to the pins $17_1$, as shown in FIGS. 1 and 2.

The protecting elements 3 are positioned on the jack block 2 and the circuit breaker 1 through a slide connection including the interfitting members 19 and 20 provided on the jack block 2 and the elements 3, respectively.

When the protecting elements 3 are being slid into position the plug $3_1$ of each element 3 penetrates a passage 21 arranged in the jack block 2 adjacent to the slot 13, said passage extending along a corresponding passage (not shown) located on the circuit breaker 1, so that the plug of the printed circuit 6 of the protection element engages between the flexible contacting blades 7 and 8 of the breaker 1.

Said small plate of the printed circuit 6 forming the plug $6_1$ constitutes the framework of the element and receives the overvoltage protecting members 4 and the fuses 5 through supports 22, 23, respectively. The supports 23 of the fuses 5 have small tongues $23_1$ located at the side of the element 3, in such a way that they are brought into frictional contact with the blades 17 of the panel $2_1$.

Each element 3 ensures protection of the two conductors of a pair, and has two sets of protecting elements each consisting of a overvoltage protection member 4 and a fuse 5. In order to ensure the connection of said two protecting elements to the flexible contacting blades 7 and 8 and to blades 17, the small plate 6 constitutes a double-face printed circuit so as to achieve a connection as shown in FIG. 6.

As it can also be noticed from FIG. 3, the case of the element 3 carries a boss 24 designed to cooperate with one of the three recesses 25, 26 and 27 corresponding in shape and located on the panel $2_1$ of the jack block 2, so as to determine three positions for embedding the element 3 into the jack block 2 through co-operation of the boss 24 with one of the cavities 25, 26 and 27.

Furthermore, the plug $6_1$, which constitutes the extension of the small plate of the printed circuit 6, carries at its end three series of conducting studs 28, 29 and 30 positioned on said plug $6_1$ in such a way that for each of the above-mentioned positions of the element 3 determined by the boss 24, one of the series of the studs 28, 29 or 30 takes position opposite the contact area of the flexible blades 7 and 8.

In this construction, the opposite surfaces of the first series of studs 28 are connected to each other opposite surfaces, while opposite surfaces of the second series of studs 29 are insulated from each other. Finally, both surfaces of the third series of studs 30 are connected to the protecting elements 4 and 5 of the conductor involved.

This arrangement makes it possible to set up three circuits depending on the position of the boss 24 of the element 3.

When the studs 28 are located between the flexible contacting blades 7 and 8, the blades 7 and 8 of the circuit breaker involved are grounded.

When the studs 29 are positioned between the contacting blades 7 and 8, the blades 8 of the circuit breaker are insulated from the subscribers line 12 while the blades 7 are connected to ground.

Finally, when the studs 30 are located between the blades 7 and 8, the protecting device of the invention is connected as shown on the diagram of FIG. 6 in which the central office lines 11 are connected to the subscriber lines 12 through the fuse 5, while the central office lines 11 are connected to ground through the overvoltage protecting element 4.

Of course, the invention is not limited to the example of embodiment disclosed and depicted hereabove, from which other methods and modes of embodiment can be provided without thereby departing from the scope of the invention.

What I claim is:

1. Apparatus for protecting the low voltage lines of a telephone system having a circuit breaker means with separable contact blades having terminal pins, said apparatus comprising a jack block, means on said jack block for mounting the same on said circuit breaker means, said jack block having conducting blades with outwardly extending pins, at least one protecting element mounted on said jack block, said element including a plug which engages and separates the contact blades of the circuit breaker means, two sets of protecting means carried by said plug, said sets of protecting means being electrically connected at one end to stud means on said plug to selectively connect said protecting means to the contact blades of the circuit breaker means and electrically connected at the other end to said conducting blades of said jack block, said jack block including a cavity which receives a metallic blade, said cavity communicating with passages which receive the terminal pins of the circuit breaker means so that the pins engage said metallic blade.

2. The invention of claim 1 in which said means on said jack block for mounting the same on the circuit breaker means includes an elongated slot which slidably receives a shoulder of the circuit breaker means.

3. The invention of claim 1 in which said jack block includes a panel along one side of which said protecting element is removably mounted, said conducting blades of said jack block being located adjacent to said panel and engageable by said elements.

4. The invention of claim 3 in which said panel of said jack block and said element include complementary cavities and a boss for selectively positioning said element relative to said jack block.

5. The invention of claim 1 in which said plug includes a plate having a printed circuit on both sides thereof, and said protecting elements being mounted on both sides of said plug.

6. The invention of claim 1 in which said plug includes first, second and third spaced series of studs on opposite sides thereof which are insulated from each other longitudinally of said plug, said first series of studs on opposite sides of said plate being connected to each other, said second series of studs on opposite sides of said plate being insulated from each other, and said third series of studs on opposite sides of said plate being connected to said protecting elements.

* * * * *